(No Model.)
S. HEIMAN.
LANTERN FOR ELECTRIC LAMPS.
No. 326,979. Patented Sept. 29, 1885.
Fig. I.
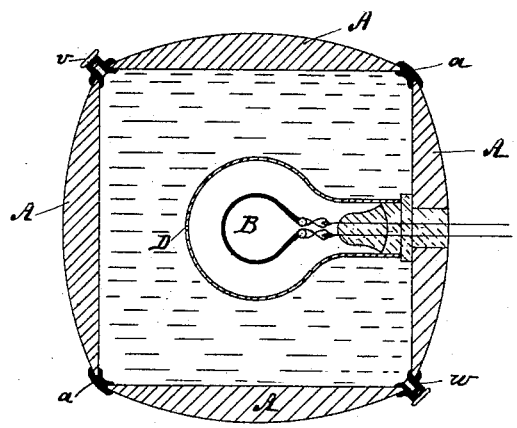
Fig. II.
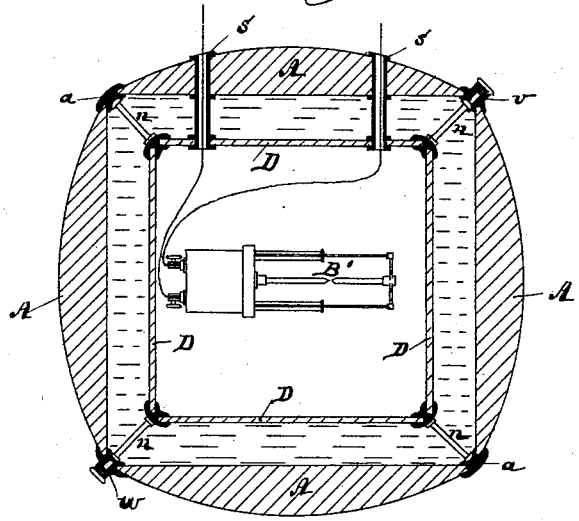
WITNESSES:
INVENTOR
Salomon Heiman
BY
Henry E. Roeder
ATTORNEY

UNITED STATES PATENT OFFICE.

SALOMON HEIMAN, OF LONDON, ENGLAND, ASSIGNOR TO FRANK L. POMMER, OF NEW YORK, N. Y.

LANTERN FOR ELECTRIC LAMPS.

SPECIFICATION forming part of Letters Patent No. 326,979, dated September 29, 1885.

Application filed August 23, 1884. (No model.) Patented in France May 1, 1884, No. 149,449.

*To all whom it may concern:*

Be it known that I, SALOMON HEIMAN, a citizen of Germany, residing at London, England, have invented a new and useful Improvement in Lanterns for Electric Lights, (for which I have made application for Letters Patent in France on or about May 1, 1884, No. 149,449,) of which the following is a specification.

My invention relates to lanterns for containing electric lights; and it consists of an external case composed of plano-convex or other suitable lenses connected together by a copper or other suitable metallic framing to make the same perfectly tight, and an inner glass case, in which latter the electric light, either "incandescent" or "arc," is arranged. The space between the inner and outer casing is filled with a suitable fluid.

In the accompanying drawings, Figure I represents a section of my improved lantern with an incandescent electric light. Fig. II is a section of a lantern with an arc electric light.

Similar letters represent similar parts.

A are plano-convex glass or crystal lenses, connected together at their edges by a suitable metallic frame, $a$, to form a perfect air and water tight case.

In Fig. I, which is arranged with an incandescent electric light, the carbon B, or any other similar substance, is inclosed in the usual manner in the glass chamber D, which latter is attached to one of the lenses A, preferably one of the side lenses, and so arranged that the carbon arc will be about in the center of the lantern. This glass chamber D forms at the same time the inner casing of the lantern. In Fig. II, which is arranged with the arc electric light, an inner glass casing D is made at some distance from the inside of the lenses A, perfectly air and water tight, and connected, through suitable stay-bolts, $n$, to the outer casing. In either form of lamp the inner case is rigidly secured to the outer case, leaving a space between them for uncongealable liquid. The lantern is thus secured against accidents occurring in submerging it and against the evil effects of cold. In the interior of this inner casing D, Fig. II, the carbon pencils B' are arranged in the usual manner, except that I prefer the same placed horizontally instead of perpendicular.

Through the upper lens and the upper part of the inner case tubes $s$ are fitted, connected perfectly tight to the same, and through which said tubes the wires for the carbons pass, and through which said tubes the required atmospheric air can pass into the interior of this casing $d$.

In the top part of the framing $a$ an opening, $v$, is made, capable of being closed tight by a suitable cap or screw, for the purpose of filling the space between the outer casing, A, and the inner casing, $d$, with the required fluid, and a similar opening, $w$, is made in the lower part of said frame, likewise closed by a suitable cap or screw, for the purpose of emptying the fluid out of this space whenever required.

The fluid used for filling the space between the outer and inner casings consists of water well distilled, with the addition of mercury as one of the distilling agents, and the addition of sufficient salt in the water to prevent the same from freezing.

A lantern constructed as above described will absorb but very little light, and may be applied for any purpose; but the principal object of this lantern is that the same can be submerged in water, and is thus applicable to be attached to the bow of a vessel below the water and illuminate the water in front of the vessel for a considerable distance in circumference, producing thereby a greater effect than any light attached to the upper part of the vessel.

It will be understood that if a lantern provided with an arc electrical light, as shown in Fig. II, is arranged to be submerged in the water, suitable tubes must be attached to the tubes $s$, conducted sufficiently high to prevent the admission of water to the inside of the inner casing D.

I do not confine myself to the use of plano-convex lenses, as any other lenses or combination of lenses may be employed for the formation of the outer casing, as the case may require, for which this lantern is to be used.

What I claim as my invention, and desire to secure by Letters Patent, is—

1. The combination of a series of lenses, A, forming a transparent lantern-case, with an inner case or chamber, D, rigidly secured to the former, a frame, a, which holds lenses A in place, and the wires extending to the carbon or carbons in the interior of case or chamber D, the space between the two cases being filled with uncongealable liquid, substantially as and for the purpose set forth.

2. The combination of outer case, A, and inner case, D, with tubes s extending through said cases, stay-bolts n, connecting them to one another, carbons B', within said inner case, and the wires extending through said tubes to said carbon, substantially as set forth.

SALOMON HEIMAN.

Witnesses:
HENRY E. ROEDER,
B. MONEY.